(12) United States Patent
Dawid

(10) Patent No.: US 9,397,742 B2
(45) Date of Patent: Jul. 19, 2016

(54) RECEIVER CIRCUIT AND METHOD PERFORMED BY SUCH RECEIVER CIRCUIT

(75) Inventor: Herbert Dawid, Herzogenrath (DE)

(73) Assignee: Intel Deutschland GmbH, Neubiberg (DE)

(*) Notice: Subject to any disclaimer, the term of this patent is extended or adjusted under 35 U.S.C. 154(b) by 151 days.

(21) Appl. No.: 13/590,357

(22) Filed: Aug. 21, 2012

(65) Prior Publication Data

US 2014/0057573 A1 Feb. 27, 2014

(51) Int. Cl.
| | |
|---|---|
| H04B 7/02 | (2006.01) |
| H04B 7/08 | (2006.01) |
| H04B 7/06 | (2006.01) |
| H04L 1/00 | (2006.01) |
| H04B 17/24 | (2015.01) |
| H04L 25/02 | (2006.01) |
| H04B 17/318 | (2015.01) |
| H04B 17/345 | (2015.01) |

(52) U.S. Cl.
CPC ............ *H04B 7/0857* (2013.01); *H04B 7/0617* (2013.01); *H04B 7/0619* (2013.01); *H04B 7/0654* (2013.01); *H04B 17/24* (2015.01); *H04L 1/0027* (2013.01); *H04B 17/318* (2015.01); *H04B 17/345* (2015.01); *H04L 25/0204* (2013.01)

(58) Field of Classification Search
CPC ........... H04L 1/00; H04L 27/00; H04L 25/49; H04B 17/00; H04B 7/02; H04Q 7/00; H04Q 7/20
USPC ............ 455/452, 101, 67.13, 67.1, 226.1, 69; 375/299, 267
See application file for complete search history.

(56) References Cited

U.S. PATENT DOCUMENTS

| | | | |
|---|---|---|---|
| 6,609,008 B1* | 8/2003 | Whang et al. | 455/522 |
| 7,054,639 B2* | 5/2006 | Lin et al. | 455/452.1 |
| 2003/0073409 A1* | 4/2003 | Nobukiyo et al. | 455/67.1 |
| 2004/0203468 A1* | 10/2004 | Dent et al. | 455/67.14 |
| 2007/0149249 A1* | 6/2007 | Chen et al. | 455/561 |
| 2007/0177541 A1* | 8/2007 | Kwon et al. | 370/329 |
| 2007/0249402 A1* | 10/2007 | Dong | H04B 7/0408 455/562.1 |
| 2009/0227208 A1* | 9/2009 | Shinoda et al. | 455/67.11 |
| 2009/0264143 A1 | 10/2009 | Satou | |
| 2009/0268841 A1* | 10/2009 | Kim et al. | 375/267 |
| 2010/0285752 A1* | 11/2010 | Lakshmanan et al. | 455/63.1 |

(Continued)

FOREIGN PATENT DOCUMENTS

CN 1567759 A 1/2005

OTHER PUBLICATIONS

3GPP Specification 25.214 dated Mar. 2012. Sections 4.3, 5.1.2.2.1.1, 7, and Annex A.

(Continued)

*Primary Examiner* — Wesley Kim
*Assistant Examiner* — Dong-Chang Shiue
(74) *Attorney, Agent, or Firm* — Eschweiler & Associates, LLC

(57) ABSTRACT

A method includes receiving a signal via a channel, determining a feedback information based on the received signal, and determining a quality indicator based on the feedback information, wherein the quality indicator indicates a quality of the received signal. The method further includes starting or resuming a transmission of the feedback information if the quality indicator fulfills a predetermined condition.

28 Claims, 9 Drawing Sheets

(56) References Cited

U.S. PATENT DOCUMENTS

2010/0304666 A1\* 12/2010 Hottinen et al. ................ 455/7
2010/0330925 A1\* 12/2010 Catreux-Erceg et al. .. 455/67.13

OTHER PUBLICATIONS

3GPP Specification 25.101 dated Mar. 2012. Section 6.4.4.
3GPP Specification 25.331 dated Mar. 2012. Section 8.5.4.

\* cited by examiner

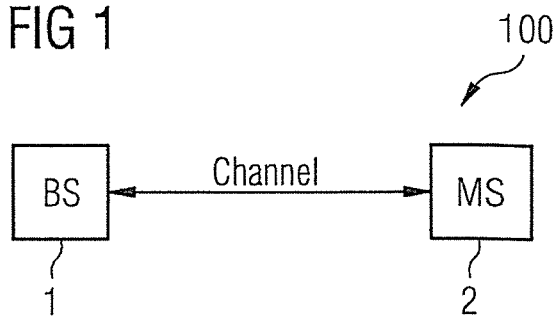
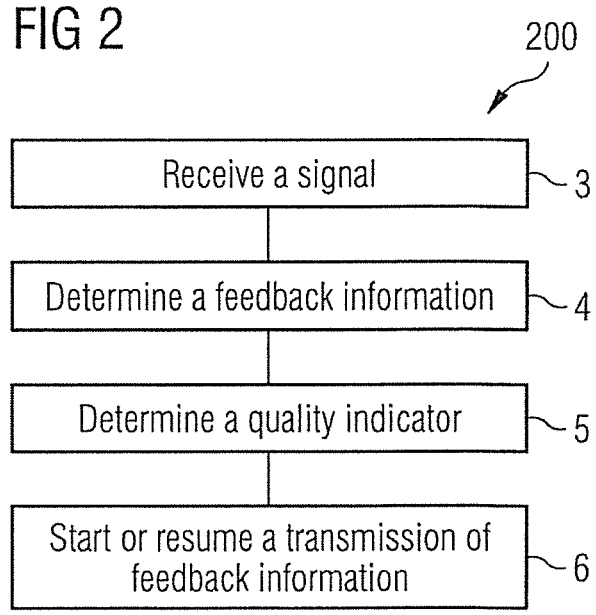

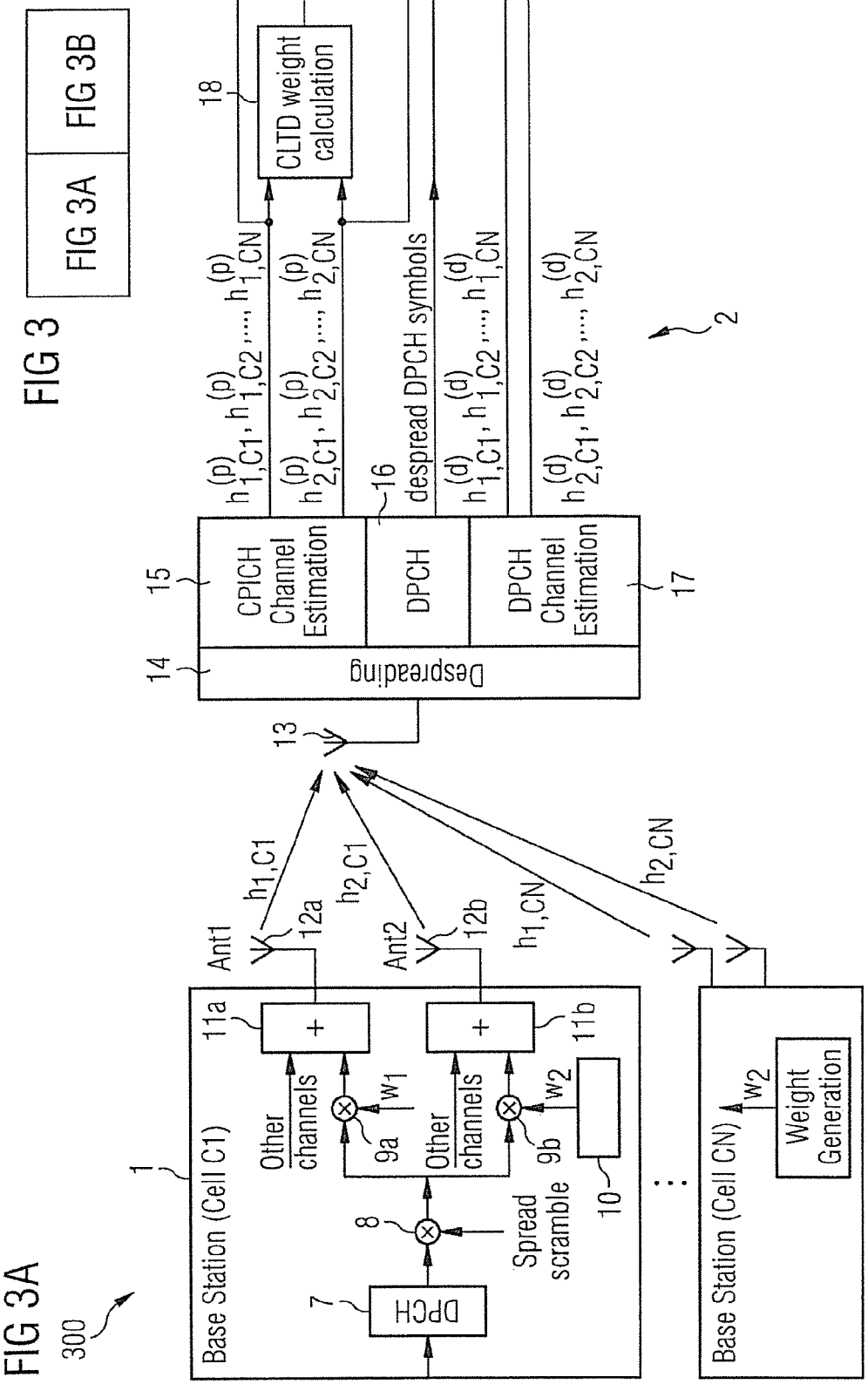

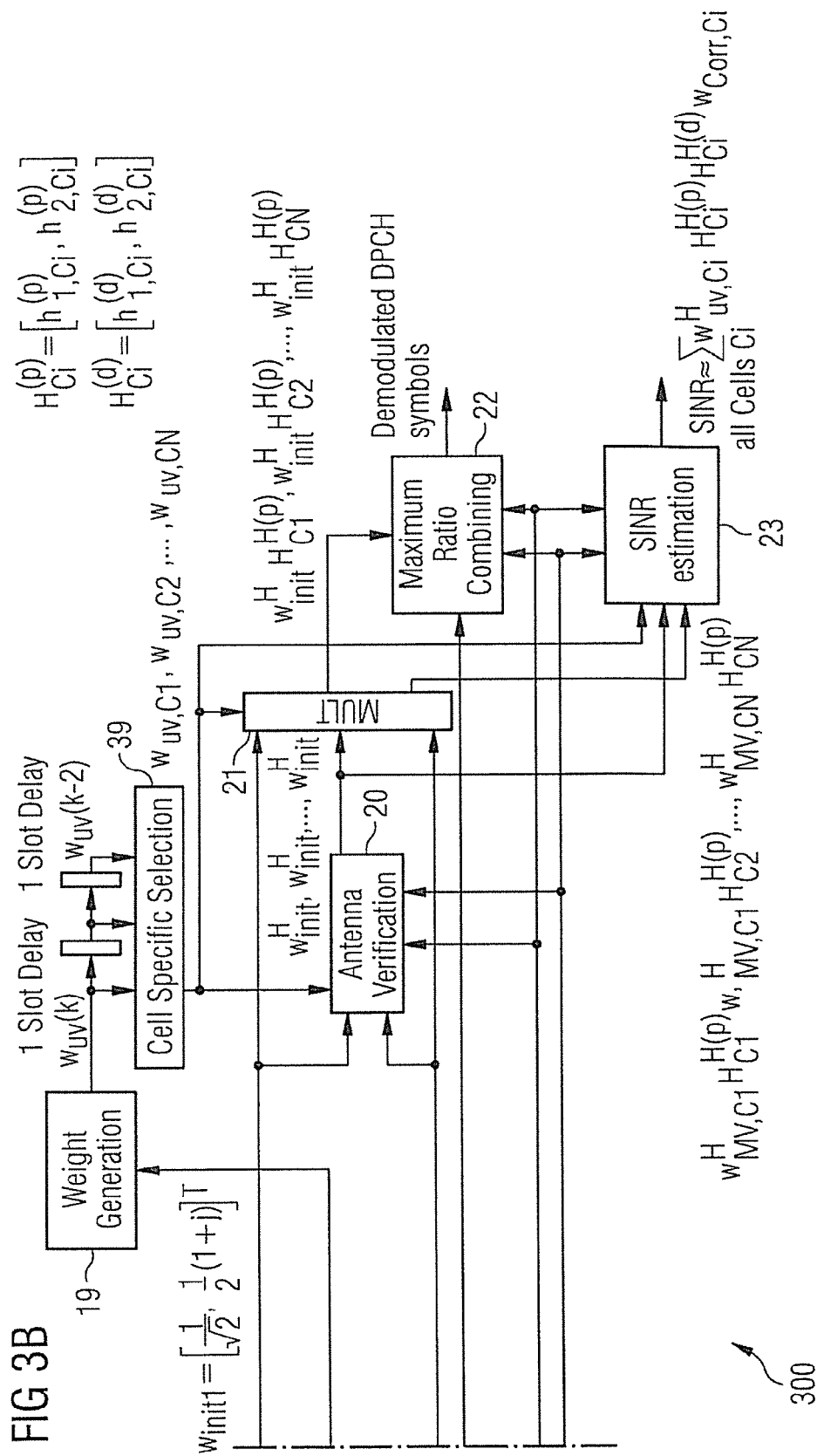

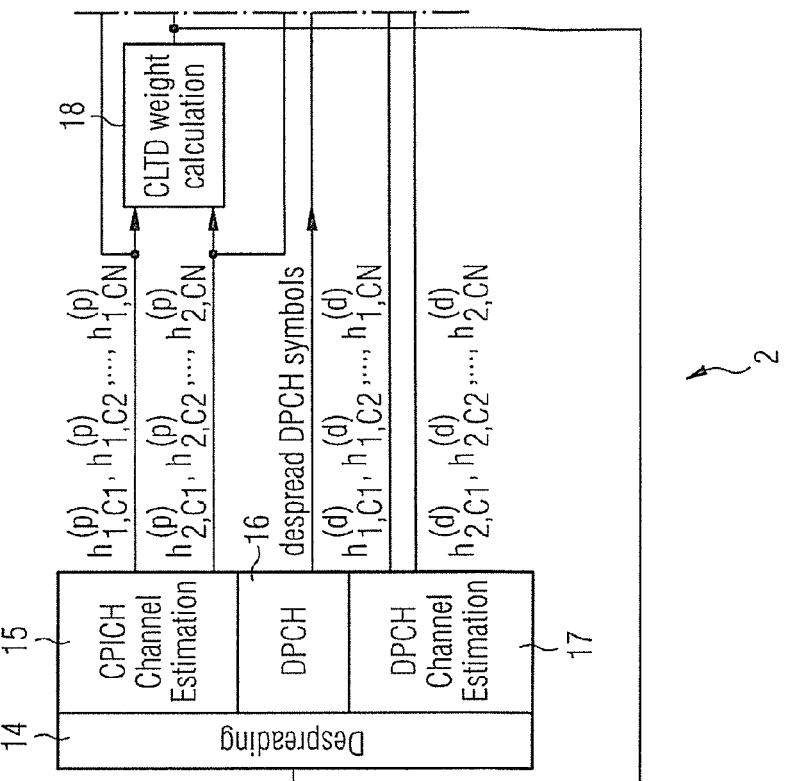
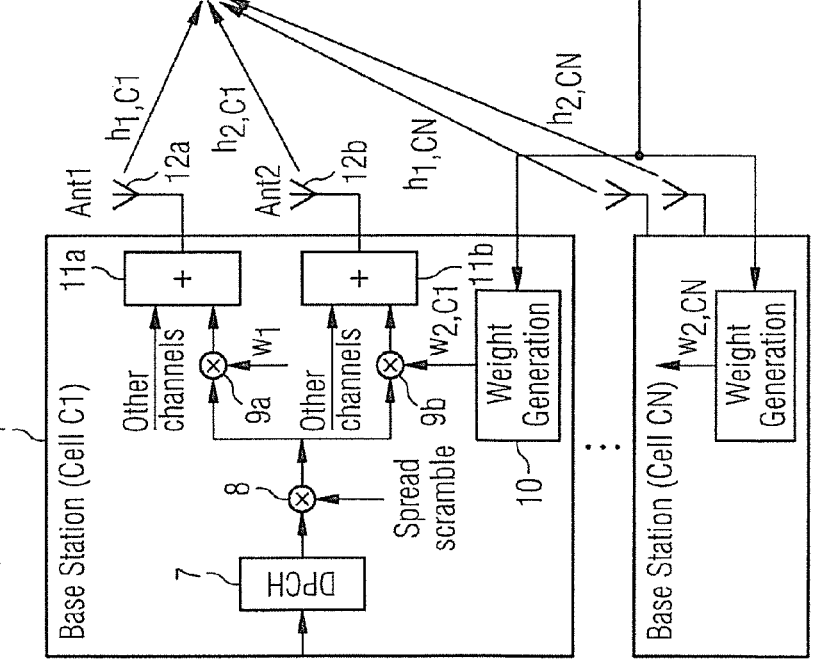
FIG 4A
FIG 4

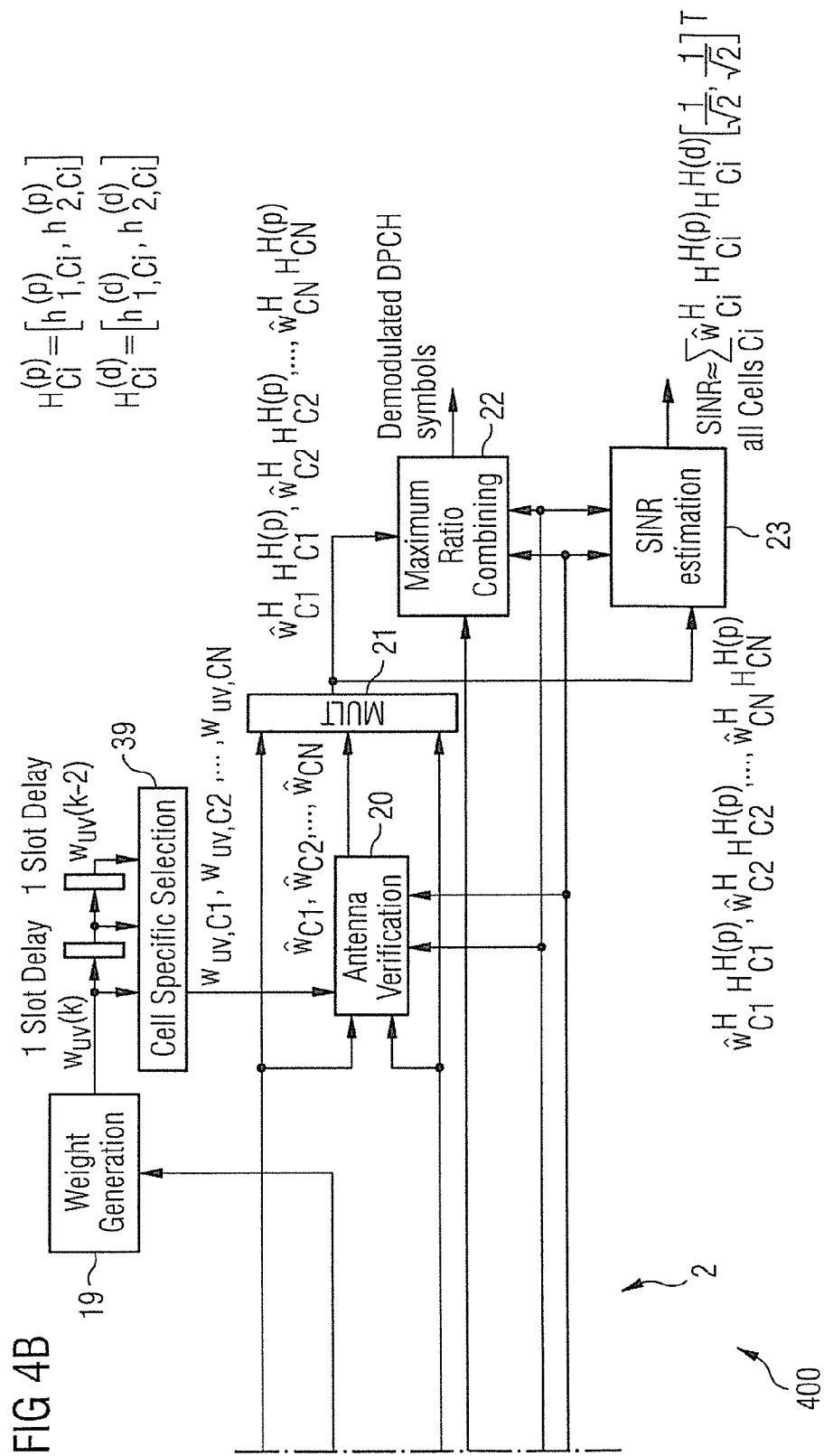

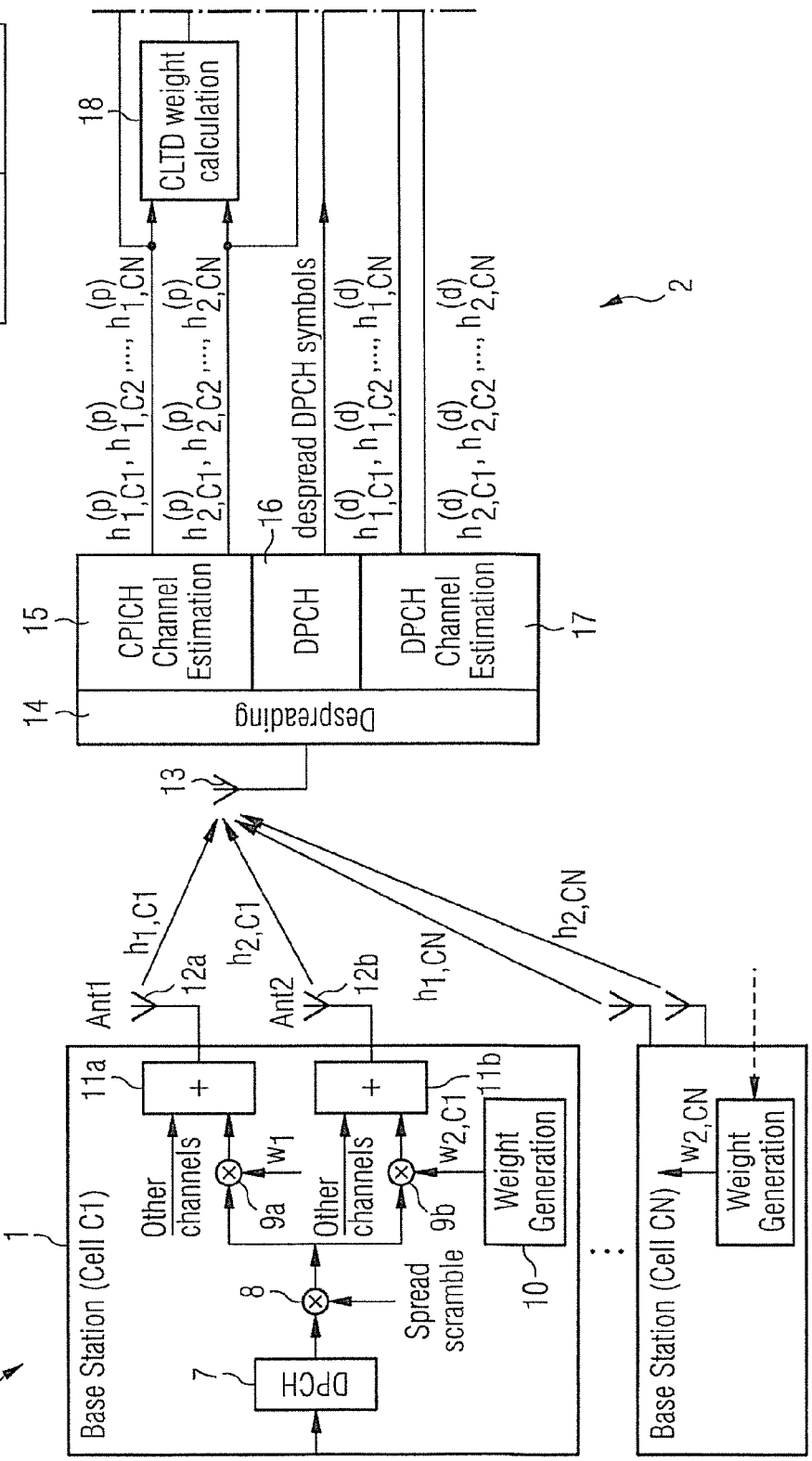

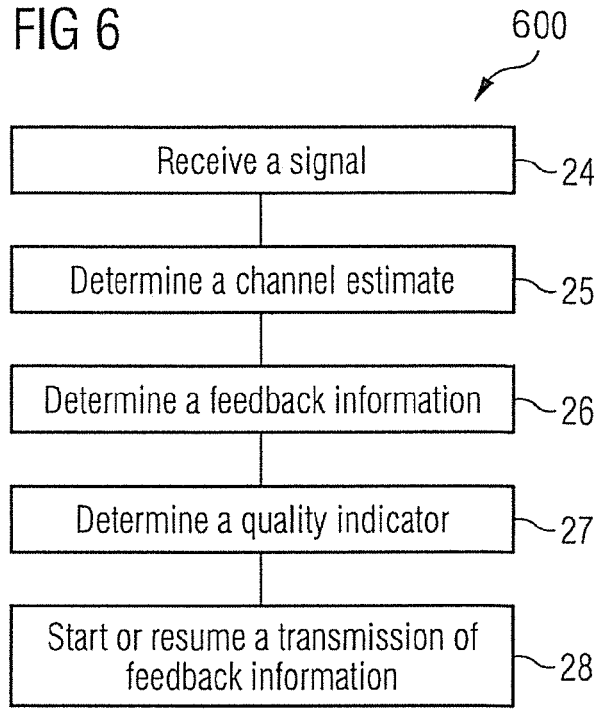
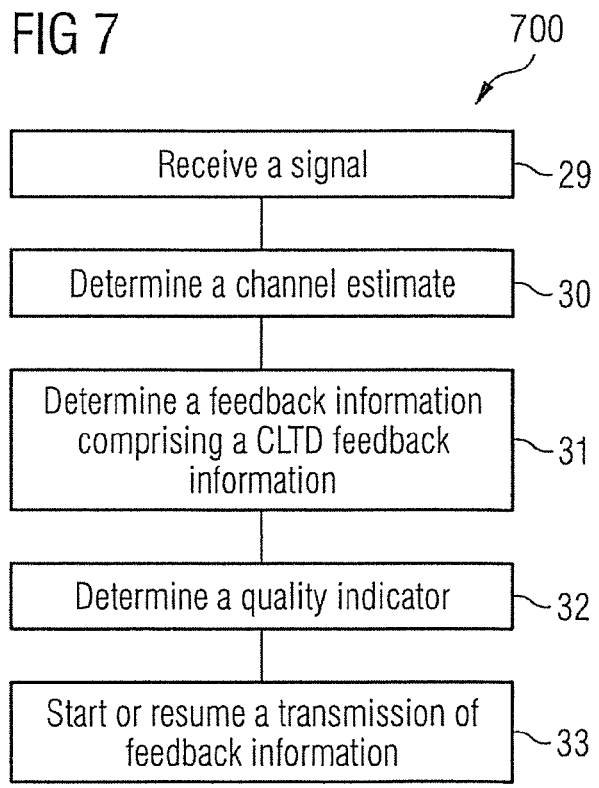

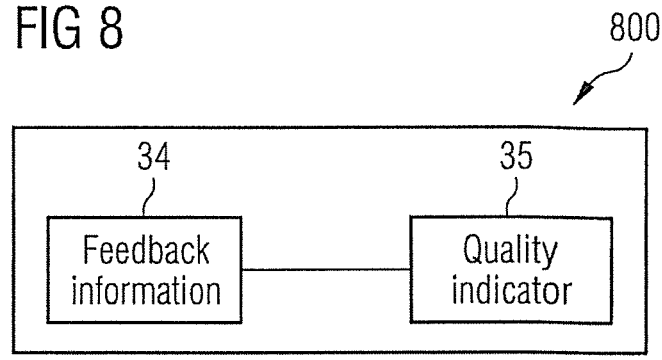
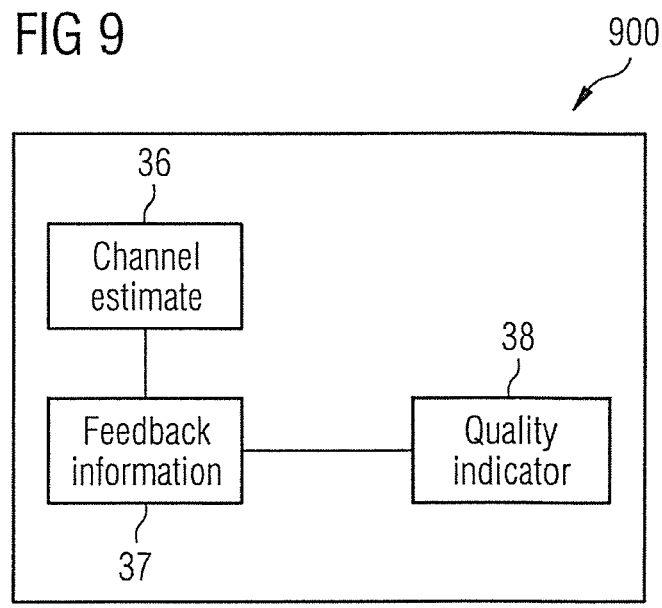

RECEIVER CIRCUIT AND METHOD PERFORMED BY SUCH RECEIVER CIRCUIT

FIELD

The invention relates to mobile communications. In particular, the invention relates to receiver circuits and methods performed by such receiver circuits.

BACKGROUND

In a radio communications system, a receiver may provide feedback information to a transmitter. The feedback information may serve to adjust a communication link between the transmitter and the receiver. Receiver circuits and methods performed by such receiver circuits constantly have to be improved. In particular, it may be desirable to improve a quality and a performance of communication links in a radio communications system.

BRIEF DESCRIPTION OF THE DRAWINGS

Aspects of the disclosure are made more evident by way of example in the following detailed description when read in conjunction with the attached drawing figures, wherein:

FIG. 1 is a schematic block diagram of a radio communications system 100 including a receiver circuit in accordance with the disclosure;

FIG. 2 is a flow chart diagram of a method 200 in accordance with the disclosure;

FIG. 3 is a schematic block diagram of a radio communications system 300 including a receiver circuit in accordance with the disclosure;

FIG. 4 is a schematic block diagram of a radio communications system 400 including a receiver circuit in accordance with the disclosure;

FIG. 6 is a flow chart diagram of a method 600 in accordance with the disclosure;

FIG. 7 is a flow chart diagram of a method 700 in accordance with the disclosure;

FIG. 8 is a schematic block diagram of a receiver circuit 800 in accordance with the disclosure; and FIG. 9 is a schematic block diagram of a receiver circuit 900 in accordance with the disclosure.

DETAILED DESCRIPTION

Figure 5B:
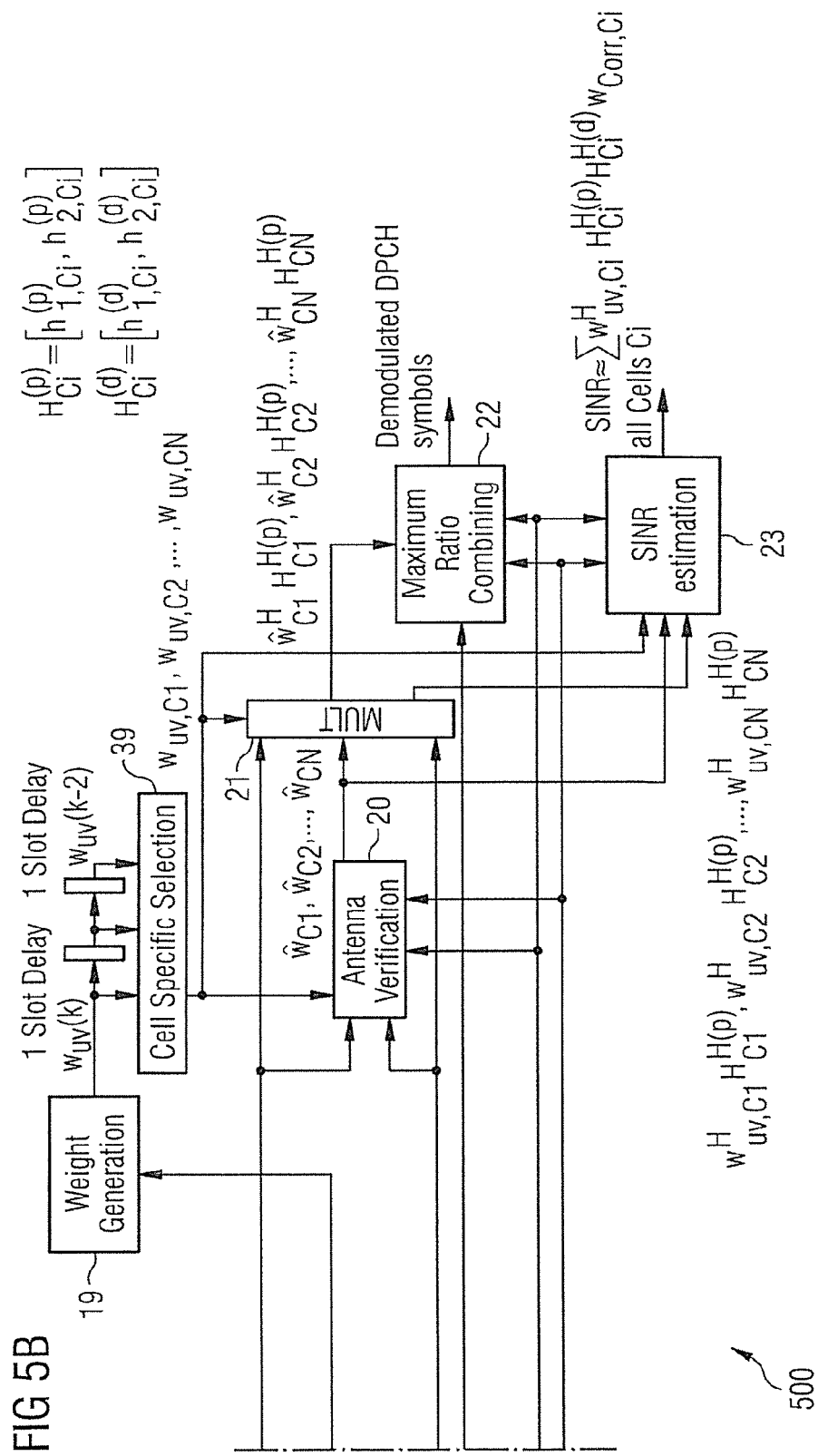
FIG. 5 is a schematic block diagram of a radio communications system 500 including a receiver circuit in accordance with the disclosure.

In the following detailed description, reference is made to the accompanying drawings, which form a part thereof, and in which are shown by way of illustration embodiments in which the disclosure may be practiced. It is understood that further embodiments may be utilized and structural or logical changes may be made without departing from the scope of the present disclosure. It is further understood that the features of the various exemplary embodiments described herein may be combined with each other, unless specifically noted otherwise. The following detailed description is therefore not to be taken in a limiting sense and the scope of the present disclosure is defined by the appended claims.

As employed in this specification, the terms "coupled" and/or "connected" are not meant to mean in general that elements must be directly coupled or connected together. Intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

As employed in this specification, to the extent that the terms "include", "have", "with" or other variants thereof are used in either the detailed description or the claims, such terms are intended to be inclusive in a manner similar to the term "comprise". The term "exemplary" is merely meant as an example, rather than the best or optimal.

Specified embodiments may be implemented in discrete circuits, partially integrated circuits or fully integrated circuits. Further, devices in accordance with the disclosure may be implemented on a single semiconductor chip or on multiple semiconductor chips connected to each other. It is understood that embodiments may be implemented in software or in dedicated hardware or partially in software and partially in dedicated hardware.

The methods and receiver circuits described herein may be used in various wireless communication networks, e.g. Code Division Multiple Access (CDMA), Time Division Multiple Access (TDMA), Frequency Division Multiple Access (FDMA), Orthogonal FDMA (OFDMA), Single Carrier FDMA (SC-FDMA) networks, etc. Such radio communications systems (or networks or systems) may include a transmitter transmitting radio communications signals via radio communications channels. The transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver or a mobile station. By way of example, a mobile station may be represented by a cellular phone, a smartphone, a tablet PC, a laptop, etc. For example, the receiver circuits described herein may be a part of a mobile station such that the terms "mobile station" and "receiver circuit" may be used synonymously in the following. It is noted that a base station may also be referred to as "Node B" or "eNode B" and a mobile station may also be referred to as "User Equipment" (UE).

Radio communications standards are e.g. described in documents provided by the "3rd Generation Partnership Project" (3GPP) organization. The following contents are included herein by reference: 3GPP TS 25.214; Technical Specification Group Radio Access Network; Physical layer procedures (FDD), in particular sections 4.3, 5.1.2.2.1.1 and 7 as well as Annex A. 3GPP TS 25.101; Technical Specification Group Radio Access Network; User Equipment (UE) radio transmission and reception (FDD), in particular section 6.4.4. 3GPP TS 25.331; Technical Specification Group Radio Access Network; Radio Resource Control (RRC), in particular section 8.5.4.

In the following, various methods in accordance with the disclosure are described. It is understood that each of the methods may be modified by adding further method steps. In particular, a method may be extended by one or more method steps described in connection with a respective other method. Additional method steps may also be derived by all further parts of this specification, unless specifically noted otherwise. It is further understood that specified features of individual methods may be combined in arbitrary ways resulting in further embodiments which are not explicitly described for the sake of simplicity.

Included block diagrams illustrating methods do not necessarily imply a specific chronological order of included method steps. Rather, indicated method steps may be performed in an arbitrary order, if reasonable from a technical point of view. Further, one or more method steps may at least partially be performed at a same time or during a same time period.

Comments made in connection with a described method may also hold true for a corresponding receiver circuit configured to perform the method and vice versa. For example, if a specific method step is specified, a corresponding receiver circuit may include a unit to perform the described method step, even if such a unit is not explicitly described or illustrated in the figures.

FIG. 1 illustrates a radio communications system 100 including a base station (BS) 1 and a mobile station (MS) 2. Radio communications signals may be transmitted from the base station 1 to the mobile station 2 and vice versa via a channel, in particular a multipath channel. On the basis of received signals the mobile station 2 may determine a feedback information and may transmit this information to the base station 1. The base station 1 may use the feedback information to adjust its signal transmission. For example, the feedback information may be used to determine weights (or weighting factors) which may serve to determine a phase relation or phase difference between multiple transmit antennas of the base station 1. The described transmission of feedback information from the mobile station 2 to the base station 1 may be referred to as feedback loop.

Before and during initializing a communication between the base station 1 and the mobile station 2, the feedback loop may be open since e.g. a (or the) transmitter of the mobile station 2 may be turned off, i.e. no feedback information is transmitted from the mobile station 2 to the base station 1. Such initialization period may be referred to as "initial synchronization" or "initial In-Sync". Turning the transmitter of the mobile station 2 off may be considered to be a safeguard, since the mobile station 2 may be unable to receive signaling and/or commands from the base station 1 with good enough quality to ensure a proper operation of the mobile station's 2 transmitter. During this initialization period the base station 1 may use a predetermined setting to adjust its signal transmission since no feedback information is available. If a certain first predetermined condition is fulfilled, the feedback loop may be closed, e.g. the transmitter of the mobile station 2 and a transmission of feedback information may be started, respectively. The downlink may then have achieved an initial synchronization state. In a similar manner, a transmission of feedback information may be interrupted, e.g. since the transmitter of the mobile station 2 may be stopped, during a communication between the base station 1 and the mobile station 2 if a second predetermined condition is fulfilled. Such a phase characterized by an open feedback loop may be referred to as "Tx-off". Generally, a state of the mobile station 2 in which the transmitter is activated may be referred to as an "In-Sync" state.

FIG. 2 illustrates a method 200 in accordance with the disclosure. For example, the method 200 may be performed by a receiver circuit included in the mobile station 2 of FIG. 1. At 3, a signal is received via a channel. At 4, a feedback information is determined based on the received signal. At 5, a quality indicator is determined based on the feedback information wherein the quality indicator indicates a quality of the received signal. At 6, a transmission of the feedback information is started or resumed if the quality indicator fulfills a predetermined condition.

It is noted that, according to the method 200, the feedback information and the quality indicator may be determined even though the feedback loop is not yet closed. Hence, a decision whether the feedback loop is closed or not may be based on a value of the quality indicator (and thus the feedback information) which would result if the feedback loop was actually closed. That is, closing the feedback loop may depend on a calculated value of a quality indicator, but not on an actually measured value of a quality indicator.

Still referring to FIG. 2, the signals received at 3 may be received in a Downlink direction. Accordingly, the feedback information determined at 4 may be transmitted in an Uplink direction. It is understood that the method 200 may be extended to a scenario in which signals are received from more than one base station (or radio cell), e.g. up to six base stations. For each base station, a respective quality indicator may be determined. However, in one example only one and the same respective feedback information may be sent from the mobile station 2 to all base stations. This may be the case for a 3GPP CLTD operation. Alternatively, for each base station, a respective feedback information and a respective quality indicator may be determined. Similarly, a transmission of a respective feedback information may be started or resumed from the mobile station 2 to the respective base station. Note that for each base station an individual or unique first and second predetermined condition may be defined. Alternatively, the first and second predetermined condition according to act 6 may be identical for each of the considered base stations. Note that for each base station an individual predetermined setting to adjust its signal transmission may be defined. Alternatively, the predetermined setting to adjust the signal transmission may be identical for each of the considered base stations.

The feedback information may include Closed Loop Transmit Diversity (CLTD) feedback information. In CLTD, the mobile station 2 may provide slot-wise feedback phase information which may be based on received channel profiles. The feedback information may be determined such that a SINR received at the mobile station 2 is maximized. For example, Feedback Signaling Message (FSM) bits may be transmitted in a Feedback Information (FBI) field which may be included in an Uplink Dedicated Physical Control Channel (DPCCH). Note that feedback information may particularly be determined, processed and transmitted in accordance with above indicated 3GPP standards.

The feedback information may correspond to or may include information on a phase adjustment of one or more antennas. For example, the signals received at 3 may have been transmitted by a first antenna and a second antenna of a base station 1. In this case, the feedback information may determine a phase adjustment of the second antenna with respect to the first antenna. It is understood that the mobile station 2 may also receive signals from more than two antennas of a base station 1 such that the feedback information may include information on multiple phase adjustments between the considered antennas. Note that such phase adjustment may particularly be defined, determined and transmitted in accordance with above indicated 3GPP standards.

The first predetermined condition at 6 may include that a quality indicator exceeds a first predetermined threshold value. For example, the quality indicator may indicate the quality of a Dedicated Physical Control Channel (DPCCH), a Dedicated Physical Channel (DPCH) or a Fractional DPCH (F-DPCH), e.g. in the form of a Signal to Interference plus Noise Ratio (SINR) or any other suitable quantity. A transmission of the feedback information may be started or resumed if the estimated quality exceeds a predetermined first threshold. Similarly, a transmission of feedback information may be interrupted or stopped if the second predetermined condition at 6 is fulfilled, e.g. if the estimated quality falls below a predetermined second threshold value. Note that such predetermined conditions and associated threshold values may be specified according to the above indicated 3GPP standards.

The first predetermined condition may include that a quality indicator exceeds a predetermined first threshold value for a predetermined first time interval. The second predetermined condition may include that a quality indicator falls below a predetermined second threshold value for a predetermined second time interval. For example, each of the predetermined first and second time intervals may correspond to multiple frames, a frame having a length of 10 ms. In particular, the predetermined first and second time intervals may have a length of about 160 ms. A frame may be divided into 15 slots of equal duration. It is noted that the feedback information may be updated every slot.

The feedback information may be determined such that a value of the quality indicator is maximized. For example, the feedback information may include information on a phase adjustment between antennas of the base station and the quality indicator may be a SINR of a DPCH. The feedback information may then be determined such that the phase adjustment results in a maximum value of the SINR.

The quality indicator may be based on a power of the received signal and a noise power. For example, the quality indicator may correspond to or may include at least one of a Signal to Noise Ratio (SNR), a SINR and an estimate of an error rate of the received signal.

The quality indicator may be based on a quality of a Transmit Power Control (TPC) command that may be used by the involved base stations for controlling an uplink power of the mobile station. Such TPC commands may be embedded in a DPCH. The transmit power of the TPC commands may differ from a transmit power of pilot symbols that may be used for an estimation of a SINR as well as from a transmit power of the actual data symbols of the DPCH. Resulting power offsets, i.e. differences between these respective values, may be signaled to the mobile station. The mobile station may then take the power offsets into account when determining the quality indicator.

The method 200 may further include determining channel estimates of the multipath channels from the base station to the mobile station, wherein the feedback information is based on the channel estimates. Based on the feedback information a transmission of the base station may thus be adjusted in accordance with current channel properties.

The physical channel via which the signal is received may include a dedicated channel, e.g. a DPCH channel, such that the quality indicator may depend on channel estimates obtained from the dedicated channel. For example, the quality indicator may correspond to or may include a SINR calculated based on the channel coefficients estimated from the DPCH and possibly further quantities. Similarly, the physical channel via which the signal is received may include a pilot channel, e.g. a CPICH, such that the quality indicator may also depend on channel estimates obtained from the pilot channel. The quality indicator may also depend on channel estimates obtained from both the dedicated and the pilot channel.

The method 200 may further include detecting if a value of the quality indicator falls below a predetermined second threshold value and turning the transmitter of the mobile station off if the quality indicator falls below a predetermined second threshold value for a certain time interval. Note that a Tx-off phase may last for only a short time interval such that an interrupt of a feedback transmission may not even be detected by the base station 1.

Before the feedback loop is closed, the base station 1 and additional involved base stations may use predetermined and constant initial weights to adjust a phase relation between transmission antennas of the base station 1 and additional involved base stations, respectively. Such initial weights may correspond to feedback information that may deviate from feedback information estimated according to act 4 of FIG. 2. To account for such deviation, the method 200 may further include determining a correction factor based on a difference between the determined feedback information and a predetermined feedback information. The quality indicator may depend on the determined correction factor.

The correction factor may be used for a complex rotation of channel coefficients that have been determined by estimating a channel, for example a DPCH.

The method 200 may be performed during an Initial In-Sync and/or a Tx-off phase. In both cases, the feedback loop is not closed. However, in case of an Initial In-Sync phase the mobile station 2 may, rather than performing an antenna verification on feedback information determined according to act 4, use the known predetermined setting used by the base station 1 for a data demodulation. In case of a Tx-off phase, the mobile station 2 may perform an antenna verification on feedback information determined according to act 4.

The method 200 may further include continuing to determine the feedback information after a transmission of feedback information has started or has been resumed (see for example act 6 of FIG. 2). Since the feedback loop is closed, the method 200 may further include performing an antenna verification on the continually determined feedback information. In a further method step, the quality indicator may be determined based on a verified feedback information.

The method 200 may further includes performing a Maximum Ratio Combining (MRC) based on the verified feedback information. In particular, an MRC scheme may be applied to DPCH data such that demodulated DPCH data, Transmit Power Control (TPC) and Transport Format Combination Indicator (TFCI) symbols may be obtained.

FIG. 3 illustrates a radio communications system 300 including a receiver circuit in accordance with the disclosure. The system 300 includes a base station 1 (see "Cell C1") and a mobile station 2. The radio communications system 300 may include up to N base stations (or radio cells) 3 communicating with the mobile station 2. The n-th base station is indicated by a block (see "Cell CN") while all further base stations are indicated by dots between the cells C1 and CN. FIG. 3 may particularly serve to illustrate an operation of the radio communications system 300 during an Initial In-Sync phase.

The base station C1 includes a processing unit 7, multipliers 8, 9a, 9b, a weight generation unit 10, combining units 11a, 11b and antennas 12a, 12b. The further base stations may be similar to the base station C1. It is understood that the base station C1 and the additional base stations may include further components which are not illustrated for the sake of simplicity. For example, each of the base stations may include a digital signal processor configured to process digital data, a unit configured to generate spreading codes, a unit configured to generate scrambling codes, a Digital-to-Analog Converter (DAC) configured to convert digital data into analog data, an up-conversion mixer configured to up-convert data from a baseband to a radio frequency band, etc.

During an operation, in particular during an Initial In-Sync phase, the processing unit 7 may process data that is to be transmitted via a DPCH, e.g. data of a DPCCH and/or a Dedicated Physical Data Channel (DPDCH). The processed data may be spread and/or scrambled by the multiplier unit 8 using a spreading code and/or a scrambling code. The spread and/or scrambled data may be forwarded to multipliers $9a$, $9b$ and weighted by weights $w_1$ and $w_2$, respectively. Each of the weighted data streams may be combined with data of other channels by the combining units $11a$, $11b$ and transmitted by the antennas $12a$, $12b$ over the air interface, respectively. It is understood that each of the base stations may include further antennas configured to transmit data weighted by corresponding further weighting factors.

The weights $w_1$ and $w_2$ may correspond to complex factors such that a multiplication performed by the multipliers $9a$, $9b$ may correspond to adjusting a phase relation or a phase difference between the antennas $12a$, $12b$. During an Initial In-Sync phase, the feedback loop is not closed such that no feedback information is transmitted from the mobile station 2 to the base station 1 and/or to further base stations 3. Accordingly, the weight generation unit 10 does not generate weights $w_1$ and $w_2$ on the basis of a feedback information. Instead, the weights $w_1$ and $w_2$ may be chosen to have initial values. The initial weights may be constant such that an initial phase between the antennas $12a$, $12b$ is kept constant. For example, the weights $w_1$ and $w_2$ may have initial values $$\frac{1}{\sqrt{2}}$$

and $$\frac{1}{2}(1+j),$$

respectively, wherein j denotes complex unity. The weights may be combined to a column vector $$w_{init} = \left[\frac{1}{\sqrt{2}}, \frac{1}{2}(1+j)\right]^T \quad (1)$$

wherein the superscript T denotes transposition. It is noted that herein lowercase bold letters indicate vectors, uppercase bold letters indicate matrices, the superscript H denotes hermitian transposition and Ci (i=1, ..., N) is used as an index referring to base station or cell Ci.

Signals transmitted by the antennas $12a$, $12b$ may propagate to the mobile station 2 via a multipath channel. Accordingly, the mobile station 2 may include multiple RAKE fingers wherein each RAKE finger is assigned to one of the multipath channel's transmission paths. The multipath channel between antennas $12a$ and $12b$ of the respective base station Ci and the mobile station 2 may be expressed by $$h_{1,Ci}=(h_{1,1},h_{1,2},\ldots,h_{1,Npath_{Ci}})_{Ci}^T \quad (2)$$

and $$h_{2,Ci}=(h_{2,1},h_{2,2},\ldots,h_{2,Npath_{Ci}})_{Ci}^T, \quad (3)$$

respectively. Here, $h_{j,Ci}$ denotes a channel coefficient vector associated with the j-th antenna of the base station with index Ci, consisting of $Npath_{Ci}$ propagation paths.

The mobile station 2 includes an antenna 13, a despreading unit 14, a first channel estimator 15, a processing unit 16, a second channel estimator 17, a weight calculation unit 18, a weight generation unit 19, an antenna verification unit 20, a multiplication unit 21, a maximum ratio combining (MRC) unit 22 and an estimation unit 23 configured to perform an estimation of a quality indicator, for example a SINR. The mobile station 2 further includes a cell specific selection unit 39 which is configured to select a weight which would be applied by the involved base stations C1, ..., CN in case of an error-free reception of the FBI bits by the base station C1, ..., CN using a known base station specific delay for applying the received weights to the transmission to the mobile station 2. This base station specific weight may also be referred to as an unverified weight.

The described components are coupled to each other in one example as indicated in FIG. 3. It is understood that the mobile station 2 may include further components which are not illustrated for the sake of simplicity. For example, the mobile station 2 may include further antennas, a digital signal processor to process digital data, a unit configured to generate spreading codes, a unit configured to generate scrambling codes, an Analog-to-Digital Converter (ADC) configured to convert analog data into digital data, a down-conversion mixer configured to down-convert data from a radio frequency band to an intermediate band or a baseband, etc.

During an operation, in particular during an Initial In-Sync phase, signals broadcast by the base stations Ci and transmitted over multiple propagation paths are received by the antenna 13. The signals may be forwarded to the despreader 14 and may be despread. In addition, the despreader 14 may also include a descrambler such that the signals may be descrambled. The first channel estimator 15 may perform an estimation using the Common Pilot Channel (CPICH) and obtain estimated channel coefficients associated with the first antenna $12a$ of a base station Ci in form of a column vector $$h_{1,Ci}^{(p)} = g_{c1,Ci}(h_{1,1},h_{1,2},\ldots,h_{1,Npath_{Ci}})_{Ci}^T + \epsilon_{1,Ci}. \quad (4)$$

Here, $g_{c1,Ci}$ denotes a variable including properties of the pilot channel for base station Ci and antenna $12a$ and $\epsilon_{1,Ci}$ denotes a residual error vector of the channel estimation. In particular, $g_{c1,Ci}$ may correspond to a square root of a (relative) transmission power of the respective CPICH. The estimated channel coefficients associated with the first antenna $12a$ and the pilot channel may also be expressed by a column vector $$h_{1,Ci}^{(p)} = (h_{1,1}^{(p)},h_{1,2}^{(p)},\ldots,h_{1,Npath_{Ci}}^{(p)})_{Ci}^T. \quad (5)$$

The antennas $12a$, $12b$ from base station Ci may use orthogonal patterns (or spreading codes) to transmit the CPICH and pilots embedded in a chosen DPCH slot which are orthogonal to each other. Hence, the receiver circuit in the mobile station 2, after despreading, may derive independent channel estimates for both antennas $12a$, $12b$ from the received CPICH and the received DPCH channel. The estimated channel coefficients associated with the second antenna $12b$ of base station Ci and the CPICH may be expressed by the column vector $$h_{2,Ci}^{(p)} = g_{c2,Ci}(h_{2,1},h_{2,2},\ldots,h_{2,Npath_{Ci}})_{Ci}^T + \epsilon_{2,Ci} \quad (6)$$

and the column vector $$h_{2,Ci}^{(p)} = (h_{2,1}^{(p)},h_{2,2}^{(p)},\ldots,h_{2,Npath_{Ci}}^{(p)})_{Ci}^T. \quad (7)$$

Here, $g_{c2,Ci}$ denotes a variable including properties of the pilot channel for base station Ci and antenna $12b$ and $\epsilon_{2,Ci}$ denotes a residual error vector of the channel estimation.

The channel coefficient column vectors of equations (5) and (7) may be combined to a channel matrix $$H_{Ci}^{(p)} = [h_{1,Ci}^{(p)}, h_{2,Ci}^{(p)}] \quad (8)$$

including all channel coefficients obtained from the CPICH, the two antennas $12a$, $12b$ and the considered base station 1 (or radio cell) (see "Cell C1"). It is understood that the mobile station 2 may also estimate channel coefficients on the basis of CPICH signals received from further base stations. A channel matrix may be determined for each additionally considered base station, i.e. $H_{C2}^{(p)}, \ldots, H_{CN}^{(p)}$, etc. The estimated channel matrices of equation (8) may be forwarded to the weight calculation unit 18, the antenna verification unit 20 and the multiplication unit 21.

The despread CPICH and DPCH signals may be forwarded from the despreader 14 to the processing unit 16. The processing unit 16 may simply forward the despread DPCH signal to the MRC 22 or may alternatively process the signals in an arbitrary fashion.

The despread signal may be forwarded from the despreader 14 to the second channel estimator 17 which may perform a channel estimation based on the signals received via the DPCH. The obtained estimated channel coefficients associated with the first antenna 12a and the DPCH of base station Ci may be expressed by a column vector $$h_{1,Ci}^{(d)} = g_{d1,Ci} w_{1,Ci} (h_{1,1}, h_{1,2}, \ldots, h_{1,Npath_{Ci}})_{Ci}^T + \eta_{1,Ci} \quad (9)$$

wherein $g_{d1,Ci}$ denotes a variable including properties of the dedicated channel for base station Ci and antenna 12a, and $\eta_{1,Ci}$ denotes a residual error of the channel estimation. In particular, $g_{d1,Ci}$ may correspond to a square root of a (relative) transmission power of the respective DPCH. The estimated channel coefficients may also be expressed by a column vector $$h_{1,Ci}^{(d)} = (h_{1,1}^{(d)}, h_{1,2}^{(d)}, \ldots, h_{1,Npath_{Ci}}^{(d)})_{Ci}^T. \quad (10)$$

Similarly, the estimated channel coefficients associated with the second antenna 12b and the DPCH of base station Ci may be expressed by $$h_{2,Ci}^{(d)} = g_{d2,Ci} w_{2,Ci} (h_{2,1}, h_{2,2}, \ldots, h_{1,Npath_{Ci}})_{Ci}^T + \eta_{2,Ci} \quad (11)$$

or $$h_{2,Ci}^{(d)} = (h_{2,1}^{(d)}, h_{2,2}^{(d)}, \ldots, h_{2,Npath_{Ci}}^{(d)})_{Ci}^T. \quad (12)$$

wherein $g_{d2,Ci}$ denotes a variable including properties of the dedicated channel for base station Ci and antenna 12b, and $\eta_{2,Ci}$ denotes a residual error of the channel estimation. It is noted that during an Initial In-Sync phase, the weights $w_{2,Ci}$ may particularly be identical and/or constant for each of the considered cells. The estimated channel coefficients of equations (10) and (12) may be forwarded to the antenna verification unit 20, the estimation unit 23, and the maximum ratio combining (MRC) unit 22. Note that during an Initial In-Sync phase, a forwarding to the antenna verification unit 20 may also be omitted because, due to an open feedback loop, an antenna verification is not necessarily performed.

The channel coefficients of equations (10) and (12) may be combined to a channel matrix $$H_{Ci}^{(d)} = [h_{1,Ci}^{(d)}, h_{2,Ci}^{(d)}] \quad (12a)$$

including all channel coefficients obtained from the DPCH, the two antennas 12a, 12b and the considered base station Ci (or radio cell). It is understood that the mobile station 2 may also estimate channel coefficients based on the DPCH signals received from further base stations. A channel matrix may be determined for each additionally considered base station, i.e. $H_{C2}^{(d)}, \ldots, H_{CN}^{(d)}$, etc. The estimated channel matrix of equation (12a) may be forwarded to the antenna verification unit 20, the estimation unit 23, and the maximum ratio combining (MRC) unit 22.

The weight calculation unit 18 may calculate data, e.g. in the form of FBI bits, which may serve as a basis for calculating weights. The weight generation unit 19 may generate weights based on the data received from the weight calculation unit 18. If the feedback loop is not closed, the generated weights may bypass the antenna verification unit 20 and thus are not verified. In particular, the unverified weights $w_{uv}(k)$, which may be calculated every slot wherein k denotes the slot number, may be identical for each of the considered base stations. A corresponding "bypass mode" may be foreseen in the receiver circuit or mobile station 2. Nevertheless, the delay until these unverified weights would be applied in the multiple base stations if the feedback loop was closed may be different for each base station, e.g. in between one or two slots. The delay used by each base station may be known to the mobile station 2. The unverified weights may be stored for the corresponding number of slots, and an unverified base station specific weight $w_{uv,Ci}$ may be determined for each base station Ci on the basis of the known delay by the cell specific selection unit 39. The resulting base station specific unverified weights $w_{uv,C1}, w_{uv,C2}, \ldots, w_{uv,CN}$ may be forwarded to the multiplication unit 21 and the estimation unit 23. Note that a delay of the unverified weights $w_{uv}(k)$ is specified in connection with FIG. 4. In this connection, it is noted that, if the individual delays are not known until the unverified weights would be applied to the downlink signal by the involved base station, a delay of one slot or even zero slots for all involved base stations may be assumed by the mobile station. Such an assumption may lead to optimistic, but still meaningful SINR estimations which are described below.

The multiplication unit 21 may receive the channel matrix $H_{Ci}^{(p)}$ of equation (8) from the first channel estimator 15, initial weights $w_{init}$ which may be identical for all involved base stations and the base station specific unverified weights $w_{uv,C1}, w_{uv,C2}, \ldots, w_{uv,CN}$, from the cell specific selection unit 39. For each considered radio cell of index Ci, the multiplication unit 21 may perform a multiplication $w_{init}^H H_{Ci}^{H(p)}$ and may forward the result to the MRC 22. Here, the index H denotes hermitian transposition. In addition, for each radio cell of index Ci, the multiplication unit 21 may perform a multiplication $w_{uv,Ci}^H H_{Ci}^{H(p)}$ and may forward the result to the estimation unit 23.

The MRC 22 may receive DPCH data from the processing unit 16 and the quantity $w_{init}^H H_{Ci}^{H(p)}$ from the multiplication unit 21. Based on the received data, the MRC 22 may perform an arbitrary MRC scheme on the DPCH data and may output demodulated DPCH data symbols, TPC data, TFCI symbols, etc. which may be processed by further components of the mobile station 2 (or the receiver circuit) which are not illustrated for the sake of simplicity. Alternatively, the MRC 22 may receive channel estimates $H_{Ci}^{(d)}$ for all involved base stations Ci from the second estimation unit 17 and the MRC 22 may perform an arbitrary MRC scheme on the DPCH data on the basis of the channel estimates $H_{Ci}^{(d)}$, e.g. using $H_{Ci}^{(d)} \cdot [1/\sqrt{2}; 1/\sqrt{2}]^T$.

The estimation unit 23 may receive the channel estimates $H_{Ci}^{(d)}$ of equation (12a) from the second estimation unit 17 as well as the quantity $w_{uv,Ci}^H H_{Ci}^{H(p)}$ from the multiplication unit 21, the unverified base station specific weights $w_{uv,C1}, w_{uv,2}, \ldots, w_{uv,CN}$ from the cell specific selection unit 39 and the N initial weights $w_{init}$ which may be equal for all involved base stations. The estimation unit 23 may calculate a quality indicator in form of a SINR which is proportional to $$SINR \approx \sum_{all\ cells\ Ci} w_{uv,Ci}^H H_{Ci}^{H(p)} H_{Ci}^{(d)} w_{Corr,Ci} \quad (13)$$

wherein the sum runs over all considered radio cells Ci. The SINR may as well be calculated using other methods for SINR estimation, which may e.g. only use the channel estimates $H_{Ci}^{(d)}$ of equation (12a) and a base station specific correction factor $w_{Corr,Ci}$.

In equation (13), $w_{Corr,Ci}$ denotes a base station specific correction factor which accounts for a difference between the weights $w_{init}$ used by the base stations and the weights $w_{uv,Ci}^H$ determined by the cell specific selection unit 39. The base station specific correction factor $w_{Corr,Ci}$ may be determined according to $$w_{corr,Ci} = \frac{w_{uv,Ci}}{w_{initial}} = \begin{cases} 1 & \text{if } w_{uv,Ci} = \left(\frac{1}{\sqrt{2}}; \frac{1}{2}(1+j)\right)^T \\ j & \text{if } w_{uv,Ci} = \left(\frac{1}{\sqrt{2}}; \frac{1}{2}(-1+j)\right)^T \\ -1 & \text{if } w_{uv,Ci} = \left(\frac{1}{\sqrt{2}}; \frac{1}{2}(-1-j)\right)^T \\ -j & \text{if } w_{uv,Ci} = \left(\frac{1}{\sqrt{2}}; \frac{1}{2}(1-j)\right)^T \end{cases} \quad (14)$$

The weights used for a calculation of the SINR according to equation (13) may particularly be determined such that the value of the SINR is maximized from the very beginning of the Initial In-Sync phase. Even though the feedback loop is not yet closed, the calculation of the maximized SINR corresponds to the SINR which would result if the CLTD feedback loop was closed. Hence, for the calculation of the SINR a closed feedback loop is assumed. An evaluation of the In-Sync criterion, i.e. a decision whether the feedback loop is to be closed or not, may be based on the value of the calculated maximized (and theoretically possible) SINR value. Depending on a network delay for applying the (CLTD) weights which is signaled to the mobile station 2, the initial mode may be terminated one or two slots after a transmission of feedback information starts.

FIG. 4 illustrates a radio communications system 400 including a receiver circuit in accordance with the disclosure. The radio communications system 400 may be similar to or may correspond to the radio communications system 300 of FIG. 3. Comments made in connection with FIG. 3 may therefore also hold true for FIG. 4. In particular, an operation of similar components may be identical unless otherwise noted. FIG. 4 may particularly serve for illustrating an operation of the radio communications system 400 for the case of a closed feedback loop. Accordingly, an operation of some components in FIG. 4 may deviate from an operation of corresponding components in FIG. 3.

In FIG. 4, an operation of the processing unit 7, the multipliers 8, 9a, 9b, the combining units 11a, 11a and the antennas 12a, 12b may correspond to the operation of similar components of FIG. 3. In contrast to FIG. 3, the feedback loop may be closed such that the weight generation unit 10 may receive feedback information, for example FBI bits, from the weight calculation unit 18. Based on the received feedback information, the weight generation units 10 in the base stations Ci may generate weights $w_1$ and $w_2$ which may be used to adjust a phase relation between the antennas 12a, 12b. Note that weights associated with different base stations may differ from each other, e.g. due to transmission errors. The weights associated with a specific base station or radio cell of index Ci may be expressed by a column vector $$w_{Ci} = [w_{1,Ci}, w_{2,Ci}]^T. \quad (15)$$

For each radio cell Ci the value of the weight $w_{1,Ci}$ be identical while the value of the weight $w_{2,Ci}$ may differ for each radio cell resulting in different phase adjustments.

It is noted that an update of the weights may be calculated every slot based on FBI bits received by the base stations. A latency (or feedback delay) between transmission of the FBI bits in the mobile station 2 and application of the corresponding weights in the base station 1 may e.g. correspond to one or two slots. Such feedback delay may be different for different base stations which may e.g. be involved in a Soft Handover (SHO) scenario.

The mobile station 2 (or the receiver circuit included therein) of FIG. 4 may include similar components as the mobile station 2 of FIG. 3. In particular, the operation of the despreader 14, the first channel estimator 15, the processing unit 16, the second channel estimator 17, the weight calculation unit 18, the weight generation unit 19 and the cell specific selection unit 39 may correspond to an operation of corresponding units in FIG. 3. However, in FIG. 4, the output of the cell specific selection unit 39 may, in particular, only be provided to the antenna verification unit 20. For an optimum operation of the antenna verification, the individual delays for each base station are desirably known to the mobile station 2 and applied by the cell specific selection unit 39 in order to provide time aligned unverified weights to the antenna verification unit 20. In this case, an assumption on the delays as described above (i.e. a delay of one slot or even zero slots for all involved base stations) may particularly be avoided.

In contrast to FIG. 3, the unverified weights output by the cell specific selection unit 39 may be forwarded to the antenna verification unit 20. In addition, the antenna verification unit 20 may receive estimated channel coefficients from the first channel estimator 15 and the second channel estimator 17, respectively. Based on the received data, the antenna verification unit 20 may perform an antenna verification in order to determine whether the feedback information which has been transmitted from the mobile station 2 to the base stations was actually applied by the respective base station, delivering the resulting verified weight vectors $\hat{w}_{C1}, \hat{w}_{C2}, \ldots, \hat{w}_{CN}$ to the multiplication unit 21. It is noted that the feedback information may be subject to Uplink transmission errors such that feedback information used by the weight generation units 10 to generate weights may deviate from the feedback information transmitted via the feedback loop. It is further noted that an antenna verification may be performed on the basis of above identified standards. The antenna verification unit 20 may output verified weight vectors $\hat{w}_{C1}, \hat{w}_{C2}, \ldots, \hat{w}_{CN} \hat{w}_{Ci}$ to the multiplication unit 21.

For each considered radio cell of index Ci, the multiplication unit 21 may receive the channel matrix $H_{Ci}^{(p)}$ of equation (8) and verified weight vectors $\hat{w}_{Ci}$. Based on the received data, the multiplication unit 21 may perform a multiplication $\hat{w}_{C1}^H H_{C1}^{H(p)}, \hat{w}_{C2}^H H_{C2}^{H(p)}, \ldots, \hat{w}_{CN}^H H_{CN}^{H(p)}$ and may forward the respective result to the MRC 22 and the estimation unit 23.

In FIG. 4, the MRC of DPCH data performed by the MRC 22 is based on the quantity $\hat{w}_{C1}^H H_{C1}^{H(p)}, \hat{w}_{C2}^H H_{C2}^{H(p)}, \ldots, \hat{w}_{CN}^H H_{CN}^{H(p)}$ instead of the quantities $w_{init}^H H_{Ci}^{H(p)}$ (see FIG. 3). Alternatively, the MRC 22 may receive channel estimates $H_{Ci}^{(d)}$ for all involved base stations Ci from the second estimation unit 17 and the MRC 22 may perform an arbitrary MRC scheme on the DPCH data on the basis of the channel estimates $H_{Ci}^{(d)}$, e.g. using $H_{Ci}^{(d)} \cdot [1/\sqrt{2}; 1/\sqrt{2}]^T$. The estimation unit 23 may determine a SINR which is proportional to $$SINR \approx \sum_{all\ cells\ Ci} \hat{w}_{uv,Ci}^H H_{Ci}^{H(p)} H_{Ci}^{(d)} [1/\sqrt{2}; 1/\sqrt{2}]^T \quad (16)$$

or any other SINR estimation method.

FIG. 5 illustrates a radio communications system 500 including a receiver circuit in accordance with the disclosure. The radio communications system 500 may be similar or may correspond to each of the radio communications systems 300 and 400 of FIGS. 3 and 4. Comments made in connection with FIGS. 3 and 4 may therefore also hold true for FIG. 5. In particular, an operation of similar components may be identical unless otherwise noted. FIG. 5 may particularly serve for illustrating an operation of the radio communications system 500 during a Tx-Off Phase. Accordingly, an operation of the components of FIG. 5 may deviate from an operation of corresponding components shown in FIGS. 3 and 4.

In contrast to FIG. 4, the weight calculation unit 18 of the mobile station 2 does not forward feedback information to the weight generation unit 10 of the base station. That is, the feedback loop is open such that no weights can be generated by the weight generation unit 10 based on the received feedback information. During a Tx-Off phase, the base stations may e.g. use the latest weights that have been used before the feedback loop was interrupted. Alternatively, the base stations may employ initial weights according to equation (1). Note that the feedback loop may be interrupted during only a short time interval such that the base stations may not even detect an interrupt of the feedback loop, and may continue to apply weights based on (possibly) erroneous received feedback information. An operation of all further components of the base station 1 may correspond to an operation of respective components of FIG. 3.

The mobile station 2 (or the receiver circuit included therein) of FIG. 5 may include similar components as the mobile station 2 of FIG. 3 or 4. In particular, the operation of the despreader 14, the first channel estimator 15, the processing unit 16, the second channel estimator 17, the weight calculation unit 18, the weight generation unit 19 and the cell specific selection unit 39 may correspond to an operation of corresponding units in FIG. 3 or 4. As already mentioned previously, an assumption of the delays as described above (i.e. a delay of one slot or even zero slots for all involved base stations) may particularly be avoided for antenna verification, and known base station specific delays may particularly be used by the cell specific selection unit 39 for selecting the unverified weights fed into the antenna verification unit 20.

In FIG. 5, base station specific unverified weights $w_{uv,C1}$, $w_{uv,C2}$, ..., $w_{uv,CN}$ output by the cell specific selection unit 39 may be forwarded to the antenna verification unit 20, the multiplication unit 21, and the estimation unit 23, respectively. Based on the unverified weights $w_{uv,C1}$, $w_{uv,C2}$, ..., $w_{uv,CN}$ and channel coefficients received from the channel estimators 15 and 17, the antenna verification unit 20 may determine verified weight vectors $\hat{w}_{C1}, \hat{w}_{C2}, ..., \hat{w}_{CN}$ for each considered radio cell of index Ci and may forward the weights $\hat{w}_{C1}, \hat{w}_{C2}, ..., \hat{w}_{CN}$ to the multiplication unit 21 and to the estimation unit 23, respectively.

For each radio cell Ci, the multiplication unit 21 may receive the channel matrix $H_{Ci}^{(p)}$ according to equation (8), unverified weights $w_{uv,C1}, w_{uv,C2}, ..., w_{uv,CN}$ and the verified weights $\hat{w}_{C1}, \hat{w}_{C2}, ..., \hat{w}_{CN}$. Based on the received data, the multiplication unit 21 may perform a multiplication $\hat{w}_{C1}^H H_{C1}^{H(p)}, \hat{w}_{C2}^H H_{C2}^{H(p)}, ..., \hat{w}_{CN}^H H_{CN}^{H(p)}$ as well as a multiplication $w_{C1}^H H_{C1}^{H(p)}, w_{C2}^H H_{C2}^{H(p)}, ..., w_{CN}^H H_{CN}^{H(p)}$ for each radio cell Ci and may forward the respective results to the MRC 22 and the estimation unit 23. In FIG. 5, the MRC of DPCH data is based on the quantity $\hat{w}_{C1}^H H_{C1}^{H(p)}, \hat{w}_{C2}^H H_{C2}^{H(p)}, ..., \hat{w}_{CN}^H H_{CN}^{H(p)}$. Alternatively, the MRC 22 may receive channel estimates $H_{Ci}^{(d)}$ for all involved base stations Ci from the second estimation unit 17 and the MRC 22 may perform an arbitrary MRC scheme on the DPCH data on the basis of the channel estimates $H_{Ci}^{(d)}$, e.g. using $H_{Ci}^{(d)} \cdot [1/\sqrt{2}; 1/\sqrt{2}]^T$. In addition, the estimation unit 23 may determine a SINR according to equation (13), but using a base station specific correction factor $$w_{corr,Ci} = \frac{w_{uv,Ci}}{\hat{w}_{Ci}} \quad (16a)$$

The SINR may as well be calculated using another method for SINR estimation, which may e.g. only use the channel estimates $H_{Ci}^{(d)}$ of equations (12a) and a base station specific correction factor $w_{Corr,Ci}$.

In FIG. 5, the same base station specific unverified weight vectors may be provided from the cell specific selection unit 39 to the antenna verification unit 20, the multiplication unit 21, and the estimation unit 23, respectively. If optimistic, but still meaningful SINR estimates are desired, a separate set of unverified weight vectors may be generated by the cell specific selection unit 39 assuming a common delay of one slot or even zero slots and may be provided to the multiplication unit 21 and the estimation unit 23, respectively. The antenna verification unit 20 may particularly still get unverified weight vectors based on known cell specific delays, if possible.

It is noted that the mobile station 2 (or the respective receiver circuits included therein) of FIGS. 3 to 5 may be seen as one mobile station (or one receiver circuit) configured to operate according to three operation modes. A first mode in accordance with the specification of FIG. 3 may be effective during an Initial In-Sync phase. A second mode in accordance with the specification of FIG. 4 may be effective when the feedback loop is closed. A third mode in accordance with the specification of FIG. 5 may be effective during a Tx-Off phase. It is straightforward to derive a merged block diagram from FIGS. 3 to 5 illustrating a mobile station (or a receiver circuit) which may be switched between these three modes.

FIG. 6 illustrates a method 600 in accordance with the disclosure. At 24, a signal is received via a channel. At 25, a channel estimate is determined based on the received signal. At 26, a feedback information is determined based on the channel estimate. At 27, a quality indicator is determined based on the feedback information and the channel estimate, wherein the quality indicator indicates a quality of the received signal. At 28, a transmission of the feedback information is started or resumed in an Uplink direction if the quality indicator fulfills a predetermined condition.

FIG. 7 illustrates a method 700 in accordance with the disclosure. At 29, a signal is received via a channel. At 30, a channel estimate is determined based on the received signal. At 31, a feedback information is determined based on the channel estimate, wherein the feedback information comprises a CLTD feedback information which is configured to specify a phase adjustment of an antenna. At 32, a quality indicator is determined based on the feedback information, wherein the quality indicator indicates a quality of the received signal. At 33, a transmission of the feedback information is started or resumed in an Uplink direction if the quality indicator exceeds a predetermined threshold value.

FIGS. 8 and 9 illustrate receiver circuits 800 and 900 in accordance with the disclosure. It is understood that besides the illustrated components, the receiver circuits 800 and 900 may include further components which are not shown for the sake of simplicity. In addition, the receiver circuits 800 and 900 may include one or more (electrical) connections between included components required to perform one or more method steps of the above described methods. It is understood that the receiver circuits 800 and 900 may include one or more additional components configured to perform any method step described in this specification. Further, each of the receiver circuits 800 and 900 may also be configured to operate as a transmitter circuit.

FIG. 8 schematically illustrates a receiver circuit 800 in accordance with the disclosure. An operation of the receiver circuit 800 may be read in connection with the method 200 of FIG. 2, but is not so limited. The receiver circuit 800 includes a unit 34 configured to determine a feedback information based on a signal received via a channel (see for example act 4 of FIG. 2). Referring back to FIGS. 3 to 5, the unit 34 may e.g. be identified with one or more of the weight calculation unit 18 and the weight generation unit 19. The receiver circuit 800 further includes a unit 35 configured to determine a quality indicator based on the feedback information, wherein the quality indicator indicates a quality of the received signal and wherein a transmission of the feedback information is started or resumed in an Uplink direction if the quality indicator fulfills a predetermined condition (see for example acts 5 and 6 of FIG. 2). Referring back to FIGS. 3 to 5, the unit 34 may e.g. be identified with the estimation unit 23.

FIG. 9 illustrates a receiver circuit 900 in accordance with the disclosure. An operation of the receiver circuit 900 may be read in connection with the method 600 of FIG. 6, but is not so limited. The receiver circuit 900 includes a unit 35 configured to determine a channel estimate based on a signal received via a channel (see for example act 25 of FIG. 6). Referring back to FIGS. 3 to 5, the unit 36 may be identified with the first channel estimator 15 and/or the second channel estimator 17. The receiver circuit 900 further includes a unit 37 configured to determine a feedback information based on the channel estimate (see for example act 26 of FIG. 6). Referring back to FIGS. 3 to 5, the unit 37 may e.g. be identified with one or more of the weight calculation unit 18 and the weight generation unit 19. The receiver circuit 900 may further include a unit 38 configured to determine a quality indicator based on the feedback information and the channel estimate, wherein the quality indicator indicates a quality of the received signal (see for example act 27 of FIG. 6) and wherein a transmission of the feedback information is started or resumed in an Uplink direction if the quality indicator fulfills a predetermined condition (see for example act 28 of FIG. 6). Referring back to FIGS. 3 to 5, the unit 38 may e.g. be identified with the estimation unit 23.

While the invention has been illustrated and described with respect to one or more implementations, alterations and/or modifications may be made to the illustrated examples without departing from the spirit and scope of the appended claims. Also, techniques, systems, subsystems and methods described and illustrated in the various embodiments may be combined with other techniques, systems, subsystems and methods without departing from the scope of the present disclosure. Other examples of changes, substitutions and alterations are ascertainable by one skilled in the art and could be made without departing from the spirit and scope disclosed herein.

What is claimed is:

1. A method, comprising:
receiving at a receiver a signal via a channel;
determining at the receiver a feedback information based on the received signal;
determining at the receiver a quality indicator based on the feedback information, wherein the quality indicator indicates a quality of the received signal; and
starting or resuming a transmission of the feedback information from the receiver when the quality indicator fulfills a predetermined condition at the receiver;
wherein the predetermined condition comprises the quality indicator exceeding a first predetermined threshold value and continuing to exceed the first predetermined threshold value for a predetermined time interval.

2. The method of claim 1, wherein the channel comprises a multipath channel.

3. The method of claim 1, wherein the feedback information comprises information on a phase adjustment of an antenna.

4. The method of claim 1, wherein the predetermined condition comprises the quality indicator exceeding a predetermined threshold value.

5. The method of claim 1, wherein the feedback information is determined such that a value of the quality indicator is maximized.

6. The method of claim 1, wherein the quality indicator comprises an estimate of an error rate of the received signal.

7. The method of claim 1, further comprising:
determining a channel estimate based on the received signal, wherein the feedback information is based on the channel estimate.

8. The method of claim 1, further comprising:
detecting when a value of the quality indicator falls below a second predetermined threshold value before the transmission of the feedback information is started, wherein the first predetermined threshold value is different from the second predetermined threshold value.

9. The method of claim 1, further comprising:
determining a correction factor based on a difference between the determined feedback information and a predetermined feedback information, wherein the quality indicator depends on the correction factor.

10. The method of claim 9, further comprising:
determining a channel estimate based on the received signal; and
using the correction factor for a complex rotation of the channel estimate.

11. The method of claim 1, wherein the feedback information is not verified by an antenna verification.

12. The method of claim 1, further comprising:
continuing to determine the feedback information after the transmission of feedback information has started or has been resumed;
performing an antenna verification on the feedback information; and
determining the quality indicator based on the verified feedback information.

13. The method of claim 12, further comprising:
performing a Maximum Ratio Combining based on the verified feedback information.

14. A method, comprising:
receiving at a receiver a signal via a channel;
determining at the receiver a channel estimate based on the received signal;
determining at the receiver a feedback information based on the channel estimate;

determining at the receiver a quality indicator based on the feedback information and the channel estimate, wherein the quality indicator indicates a quality of the received signal; and starting or resuming a transmission of the feedback information from the receiver in an Uplink direction when the quality indicator fulfills a predetermined condition at the receiver;

wherein the predetermined condition comprises the quality indicator exceeding a first predetermined threshold value and continuing to exceed the first predetermined threshold value for a predetermined time interval.

15. A method, comprising:

receiving at a receiver a signal via a channel;

determining at the receiver a channel estimate based on the received signal;

determining at the receiver a feedback information based on the channel estimate, wherein the feedback information comprises a Closed Loop Transmit Diversity feedback information which is configured to specify a phase adjustment of an antenna;

determining at the receiver a quality indicator based on the feedback information, wherein the quality indicator indicates a quality of the received signal; and starting or resuming a transmission of the feedback information from the receiver in an Uplink direction when the quality indicator exceeds a first predetermined threshold value and continues to exceed the first predetermined threshold value for a predetermined time interval at the receiver.

16. A receiver circuit, comprising:

a unit configured to determine a feedback information based on a signal received via a channel; and a unit configured to determine a quality indicator based on the feedback information, wherein the quality indicator indicates a quality of the received signal, and wherein a transmission of the feedback information is started or resumed from the receiver in an Uplink direction when the quality indicator fulfills a predetermined condition at the receiver;

wherein the predetermined condition comprises the quality indicator exceeding a first predetermined threshold value and continuing to exceed the first predetermined threshold value for a predetermined time interval.

17. The receiver circuit of claim 16, further comprising:

a unit configured to determine a channel estimate and provide the channel estimate to the unit configured to determine the feedback information.

18. The receiver circuit of claim 16, wherein the channel comprises a Dedicated Physical Channel and the receiver circuit further comprises:

a unit configured to determine a channel estimate of the Dedicated Physical Channel and provide the channel estimate to the unit configured to determine the quality indicator.

19. A receiver circuit, comprising:

a unit configured to determine a channel estimate based on a signal received via a channel;

a unit configured to determine a feedback information based on the channel estimate; and a unit configured to determine a quality indicator based on the feedback information and the channel estimate, wherein the quality indicator indicates a quality of the received signal, and wherein a transmission of the feedback information is started or resumed from the receiver in an Uplink direction when the quality indicator fulfills a predetermined condition at the receiver;

wherein the predetermined condition comprises the quality indicator exceeding a first predetermined threshold value and continuing to exceed the first predetermined threshold value for a predetermined time interval.

20. The method of claim 1, wherein the predetermined time interval comprises a time interval associated with a plurality of frames.

21. The method of claim 14, further comprising:

detecting when a value of the quality indicator falls below a second predetermined threshold value before the transmission of the feedback information is started, wherein the first predetermined threshold value is different from the second predetermined threshold value.

22. The method of claim 14, wherein the predetermined time interval comprises a time interval associated with a plurality of frames.

23. The method of claim 15, further comprising:

detecting when a value of the quality indicator falls below a second predetermined threshold value before the transmission of the feedback information is started, wherein the first predetermined threshold value is different from the second predetermined threshold value.

24. The method of claim 15, wherein the predetermined time interval comprises a time interval associated with a plurality of frames.

25. The receiver circuit of claim 16, wherein the transmission of the feedback information is stopped or interrupted from the receiver in the Uplink direction when the quality indicator falls below a second predetermined threshold value, wherein the first predetermined threshold value is different from the second predetermined threshold value.

26. The receiver circuit of claim 16, wherein the predetermined time interval comprises a time interval associated with a plurality of frames.

27. The receiver circuit of claim 19, wherein the transmission of the feedback information is stopped or interrupted from the receiver in the Uplink direction when the quality indicator falls below a second predetermined threshold value, wherein the first predetermined threshold value is different from the second predetermined threshold value.

28. The receiver circuit of claim 19, wherein the predetermined time interval comprises a time interval associated with a plurality of frames.

* * * * *